(12) United States Patent
Adell et al.

(10) Patent No.: US 9,024,606 B2
(45) Date of Patent: May 5, 2015

(54) LOW-TO-MEDIUM POWER SINGLE CHIP DIGITAL CONTROLLED DC-DC REGULATOR FOR POINT-OF-LOAD APPLICATIONS

(75) Inventors: Philippe C. Adell, Pasadena, CA (US); Bertan Bakkaloglu, Scottsdale, AZ (US); Bert Vermeire, San Diego, CA (US); Tao Liu, San Diego, CA (US)

(73) Assignees: California Institute of Technology, Pasadena, CA (US); Arizona State University, Ira A. Fulton Schools of Engineering, Tempe, AZ (US)

( * ) Notice: Subject to any disclaimer, the term of this patent is extended or adjusted under 35 U.S.C. 154(b) by 690 days.

(21) Appl. No.: 13/332,343

(22) Filed: Dec. 20, 2011

(65) Prior Publication Data
US 2012/0153917 A1 Jun. 21, 2012

Related U.S. Application Data

(60) Provisional application No. 61/425,126, filed on Dec. 20, 2010.

(51) Int. Cl.
 *H02M 3/157* (2006.01)
 *H02M 3/158* (2006.01)
 *H02M 1/00* (2006.01)

(52) U.S. Cl.
 CPC .... *H02M 3/1588* (2013.01); *H02M 2001/0009* (2013.01); *H02M 2001/0012* (2013.01); *Y02B 70/1466* (2013.01)

(58) Field of Classification Search
 CPC .............. H02M 2001/0009; H02M 2001/0012
 USPC .......................... 327/270, 269, 273, 274, 263; 331/DIG. 2; 363/21.01; 323/283, 351; 361/221
 See application file for complete search history.

(56) References Cited

U.S. PATENT DOCUMENTS 5,982,160 A 11/1999 Walters et al.
6,448,745 B1 9/2002 Killat
(Continued)

FOREIGN PATENT DOCUMENTS

JP 2006133094 A * 5/2006

OTHER PUBLICATIONS

"A digitally controlled DC-DC buck converter using frequency domain ADCs," Ahmad, H. and Bakkaloglu. B., Applied Power Electronics Conference and Exposition (APEC), 2010 Twenty-Fifth Annual IEEE, pp. 1871-1874, Feb. 21-25, 2010.*

(Continued)

*Primary Examiner* — Matthew Nguyen
*Assistant Examiner* — Jye-June Lee
(74) *Attorney, Agent, or Firm* — Christie, Parker & Hale, LLP

(57) ABSTRACT

A DC-DC converter for generating a DC output voltage includes: a digitally controlled pulse width modulator (DPWM) for controlling a switching power stage to supply a varying voltage to an inductor; and a digital voltage feedback circuit for controlling the DPWM in accordance with a feedback voltage corresponding to the DC output voltage, the digital voltage feedback circuit including: a first voltage controlled oscillator for converting the feedback voltage into a first frequency signal and to supply the first frequency signal to a first frequency discriminator; a second voltage controlled oscillator for converting a reference voltage into a second frequency signal and to supply the second frequency signal to a second frequency discriminator; a digital comparator for comparing digital outputs of the first and second frequency discriminators and for outputting a digital feedback signal; and a controller for controlling the DPWM in accordance with the digital feedback signal.

18 Claims, 14 Drawing Sheets

(56) References Cited

U.S. PATENT DOCUMENTS

| | | | |
|---|---|---|---|
| 6,958,721 | B2 | 10/2005 | Vincent et al. |
| 7,148,669 | B2 | 12/2006 | Maksimovic et al. |
| 7,239,117 | B2 | 7/2007 | Lee et al. |
| 7,271,608 | B1 | 9/2007 | Vermeire et al. |
| 8,278,895 | B2 * | 10/2012 | Gardner et al. ............... 323/282 |
| 2008/0042632 | A1 | 2/2008 | Chapuis et al. |
| 2008/0203992 | A1 | 8/2008 | Qahouq et al. |
| 2009/0013199 | A1 | 1/2009 | Leung et al. |
| 2009/0066382 | A1 * | 3/2009 | Yousefzadeh et al. ........ 327/175 |
| 2009/0267582 | A1 | 10/2009 | Prodic et al. |

OTHER PUBLICATIONS

"A DC-DC Digitally Controlled Buck Regulator Utilizing First-order Sigma-Delta Frequency Discriminators," Ahmad, H. and Bakkaloglu, B., Applied Power Electronics Conference and Exposition (APEC), 2008 Twenty-Third Annual IEEE, pp. 346-352, Feb. 24-28, 2008.*

Adell, et al. "Digital Control for Radiation-Hardened Switching Converters in Space," IEEE Transactions on Aerospace and Electronic Systems, vol. 46, No. 2, pp. 761-770 (Apr. 2010).

Adell, et al. "An SET-Free, All-Digital Controlled Point-of-Load Regulator for Next-Generation Power Systems: ADC-POL," IEEE Transactions on Nuclear Science, vol. 58, No. 6, pp. 3011-3017 (Dec. 2011).

Adell, et al. "Single Event Transient Propagation Through Digital Optocouplers," IEEE Transactions on Nuclear Science, vol. 52, No. 4, pp. 1136-1139 (Aug. 2005).

Adell, et al. "Total-Dose and Single-Event Effects in DC/DC Converter Control Circuitry," IEEE Transactions on Nuclear Science, vol. 50, No. 6, pp. 1867-1872 (Dec. 2003).

Adell, et al. "Total-Dose and Single-Event Effects in Switching DC/DC Power Converters," IEEE Transactions on Nuclear Science, vol. 49, No. 6, pp. 3217-3221 (Dec. 2002).

Ahmad, et al. "A 300mA 14mV-Ripple Digitally Controlled Buck Converter Using Frequency Domain $\Delta\Sigma$ ADC and Hybrid PWM Generator," IEEE International Solid-State Circuits Conference, Session. 10.4, pp. 202-204 (2010).

Ahmad, et al. "A DC-DC Digitally Controlled Buck Regulator Utilizing First-order $\Sigma$—$\Delta$ Frequency Discriminators," IEEE 23rd Applied Power Electronics Conference (APEC), pp. 346-352 (Feb. 24-28, 2008).

Ahmad, et al. "A DC-DC Digitally Controlled Buck Regulator Utilizing Multi-bit $\Sigma$—$\Delta$ Frequency Discriminators," IEEE 23rd Applied Power Electronics Conference (APEC), pp. 1543-1548 (Feb. 24-28, 2008).

Goodman, et al. "Practical application of PHM/Prognostics to COTs power converters," Proceedings of the 2005 IEEE Aerospace Conference, pp. 3573-3578 (2005).

Johnston, et al. "Single-Event Transients in Voltage Regulators," IEEE Transactions on Nuclear Science, vol. 53, No. 6, pp. 3455-3461 (Dec. 2006).

Lee et al. "A Common Mode Voltage Reduction in Boost Rectifier/Inverter System by Shifting Active Voltage Vector in a Control Period," IEEE Transactions on Power Electronics, vol. 15, No. 6, pp. 1094-1101 (Nov. 2000).

Leung, et al. "Design and Implementation of a Practical Digital PWM Controller," IEEE Applied Power Electronics Conference (APEC), pp. 1437-1442 (2006).

Lyles, et al. "An Injection-Locked Frequency-Tracking $\Sigma\ \Delta$ Direct Digital Frequency Synthesizer," IEEE Transactions on Circuits and Systems-II: Express Briefs, vol. 54, No. 5, pp. 402-406 (May 2007).

Forghani-zadeh, et al. "An Accurate, Continuous, and Lossless Self-Learning CMOS Current-Sensing Scheme for Inductor-Based DC-DC Converters," IEEE Journal of Solid-State Circuits, vol. 42, No. 3, pp. 665-679 (Mar. 2007).

Shirazi, et al. "Autotuning Techniques for Digitally-Controlled Point-of-Load Converters with Wide Range of Capacitive Loads," IEEE Applied Power Electronics Conference (APEC), pp. 14-20 (2007).

Syed, et al. "Digital Pulse Width Modulator Architectures," 35th Annual IEEE Power Electronics Specialists Conference, Aachen, Germany, pp. 4689-4695 (2004).

Wang, et al. "A 70V UMOS Technology with Trenched LOCOS Process to Reduce $C_{gs}$," Proceedings of the 19th International Symposium on Power Semiconductor Devices & ICs, Jeju, Korea, pp. 181-184 (May 27-30, 2007).

Woo et al. "Load-Independent Control of Switching DC-DC Converters With Freewheeling Current Feedback," IEEE Journal of Solid-State Circuits, vol. 43, No. 12, pp. 2798-2808 (Dec. 2008).

Yoo, "A CMOS Buffer Without Short-Circuit Power Consumption," IEEE Transactions on Circuits and Systems-II: Analog and Digital Signal Processing, vol. 47, No. 9, pp. 935-937 (Sep. 2000).

Zhou, et al. "A Novel Current-Sharing Control Technique for Low-Voltage High-Current Voltage Regulator Module Applications," IEEE Transactions on Power Electronics, vol. 15, No. 6, pp. 1153-1162 (Nov. 2000).

International Search Report and Written Opinion for PCT/US2011/066321, filed Dec. 20, 2011, dated May 21, 2012 (8 pages).

* cited by examiner

US 9,024,606 B2

LOW-TO-MEDIUM POWER SINGLE CHIP DIGITAL CONTROLLED DC-DC REGULATOR FOR POINT-OF-LOAD APPLICATIONS

CROSS-REFERENCE TO RELATED APPLICATION(S)

This non-provisional application claims the benefit of U.S. Provisional Application No. 61/425,126, filed on Dec. 20, 2010.

STATEMENT REGARDING FEDERALLY SPONSORED RESEARCH OR DEVELOPMENT

The invention described herein was made in the performance of work under a NASA contract, and is subject to the provisions of Public Law 96-517 (35 U.S.C. §202) in which the Contractor has elected to retain title.

BACKGROUND

Embodiments of the present invention are directed to the field of DC-DC conversion circuits.

DC-DC converters such as buck (step-down) converters, boost (step-up) converters, and buck-boost converters, use inductors as a storage element to perform the DC-DC conversion. In addition, DC-DC converter designs also include a current sense resistor for short circuit detection, multi-stage converter load balancing, thermal control, and load independent control. More recently, the inductor DC resistance (DCR) may be used instead of a separate current sense resistor to reduce circuit complexity and reduce losses. However, the DCR value as reported by a data sheet often deviates by +/−15% or more from the actual DCR value of the inductor. In addition, temperature effects can also influence the resistance of the inductor.

The characteristics of the driving waveforms applied to the DC-DC converter for generating various output DC voltages generally depend on the inductance value of the inductor. As such, a DC-DC converter is typically designed to operate in conjunction with an inductor having an inductance within a particular, predetermined range. In addition, the DCR (or the temperature profile of the DCR) of the inductor is generally assumed to be relatively constant over the life of the device.

SUMMARY

Aspects of embodiments of the present invention are directed to a DC-DC converter which provides a digital feedback signal to control the DC output.

Other aspects of the present invention are directed to a DC-DC converter which includes a built-in-self-test (BIST) circuit for measuring, with good accuracy, the inductance and series DC resistance (DCR) of an inductor in the circuit and methods for measuring an inductance and a series DCR of an inductor in the circuit during the start-up of the DC-DC converter.

Aspects of embodiments of the present invention are also directed to a digitally controlled single chip solution, making high switching frequency and high resolution applications possible, and having a high accuracy, low complexity, on-line inductor characterization circuit to enable: current mode control; lossless average current sensing using the DCR of the inductor; and flexible, time-efficient, and analog friendly design capabilities using field programmable gate array (FPGA) proportional integral-derivative (PID) register-transfer level (RTL) code.

An all-digital controlled DC-DC switching converter that provides a stable DC output voltage from an unregulated source with optimum efficiency includes: a digitally controlled pulse width modulator (DPWM) for controlling a switching power stage to supply a varying voltage to an inductor; and a digital voltage feedback circuit for controlling the DPWM in accordance with a feedback voltage corresponding to the DC output voltage. The digital voltage feedback circuit includes: a ΣΔ analog-to-digital converter (ADC) that is built with two voltage controlled oscillators (VCOs), one converts the output voltage into a frequency signal, the other serves as a reference; two sigma-delta discriminators that digitize the two frequency signals generated from the VCOs and a digital comparator that generates the digital error between the two digitized frequency signals; a proportional integrator derivative (PID) circuit that accurately generates a 9-bit number to the DPWM blocks before being converted in the actual duty cycle that drives the power stage.

According to one embodiment of the present invention, a DC-DC converter configured to generate a DC output voltage includes: a digitally controlled pulse width modulator configured to control a switching power stage to supply a varying voltage to an inductor; and a digital voltage feedback circuit configured to control the digitally controlled pulse width modulator in accordance with a feedback voltage corresponding to the DC output voltage, the digital voltage feedback circuit including: a first voltage controlled oscillator configured to convert the feedback voltage into a first frequency signal and to supply the first frequency signal to a first frequency discriminator; a second voltage controlled oscillator configured to convert a reference voltage into a second frequency signal and to supply the second frequency signal to a second frequency discriminator; a digital comparator configured to compare digital outputs of the first and second frequency discriminators and to output a digital feedback signal; and a controller configured to control the digitally controlled pulse width modulator in accordance with the digital feedback signal.

The DC-DC converter may further include: a triangular current source coupled to the inductor; and a read-out circuit for measuring a voltage across the inductor, the read-out circuit comprising: a low-pass filter having a first terminal coupled to a first end of the inductor and a second terminal coupled to a second end of the inductor, the low-pass filter supplying an inductor voltage corresponding to the voltage across the inductor; and a third voltage controlled oscillator configured to convert the inductor voltage into a third frequency signal and to supply the third frequency signal to a third frequency discriminator, the third frequency discriminator being coupled to the digital comparator to compare the digital outputs of the second and third frequency discriminators; wherein the controller is configured to measure an inductance of the inductor based on a magnitude of a voltage waveform of the inductor voltage, the voltage waveform being generated when a triangular current waveform is applied to the inductor, and wherein the controller is further configured to control the digitally controlled pulse width modulator in accordance with the measured inductance.

The controller may be further configured to measure a resistance of the inductor based on a slope of the voltage waveform of the inductor voltage.

The controller may be further configured to compute a magnitude of a current flowing through a load coupled to the DC output voltage, the magnitude of the current being computed in accordance with the voltage across the inductor and the measured resistance of the inductor.

The low-pass filter may be a first order low pass filter. The low-pass filter may include: an op-amp; and a feedback resistor and a feedback capacitor coupled in parallel between the output of the op-amp and an inverting input of the op-amp.

The DC-DC converter may further include a DC-offset control circuit, the DC-offset control circuit including: a feedback resistor and a feedback capacitor coupled in parallel between a reference voltage source and a non-inverting input of the op-amp.

The low-pass filter may be a Sallen-Key or Tow-Thomas biquad filter.

The DC-DC converter may be a buck converter, a boost converter, or a buck-boost converter.

The DC-DC converter may further include a CIC decimator coupled between the digital comparator and the controller, and configured to decimate the digital feedback signal received from the digital comparator and to supply the decimated digital feedback signal to the controller.

The DC-DC converter may further include a plurality of CIC decimators, each of the CIC decimators being coupled between a corresponding one of the frequency discriminators and the digital comparator, and configured to decimate the digital outputs received from the frequency discriminators and to supply the decimated digital outputs to the digital comparator.

The digitally controlled pulse width modulator may be configured to have an output duty cycle controlled by a plurality of most significant bits and a plurality of least significant bits, and wherein the digitally controlled pulse width modulator includes: a counter configured to supply the most significant bits; and a delay locked loop configured to supply the least significant bits.

According to another embodiment of the present invention, a method of operating a DC-DC converter including an inductor includes, during power up of the DC-DC converter: supplying a triangular current to the inductor; measuring a voltage waveform across the inductor; computing an inductance of the inductor based on a magnitude of the voltage waveform; computing a resistance of the inductor based on a slope of the voltage waveform; and configuring a controller to apply driving waveforms to the inductor in accordance with the computed inductance and the computed resistance.

The measuring the voltage waveform across the inductor may include: low-pass filtering an inductor voltage measured across the inductor; converting the filtered inductor voltage to a first frequency signal corresponding to the inductor voltage; converting the first frequency signal into a first digital signal corresponding to the frequency of the first frequency signal; converting a first reference voltage to a second frequency signal corresponding to the first reference voltage; converting the second frequency signal into a second digital signal corresponding to the frequency of the second frequency signal; and comparing the first digital signal to the second digital signal to produce the measured voltage waveform across the inductor.

The method may further include decimating the first digital signal and the second digital signal, wherein the comparing the first digital signal to the second digital signal comprises comparing the decimated first digital signal and the decimated second digital signal.

The method may further include decimating the measured voltage waveform.

The method may further include, during operation of the DC-DC converter: converting an output voltage of the DC-DC converter to a third frequency signal corresponding to the output voltage; converting the third frequency signal to a third digital signal corresponding to the frequency of the third frequency signal; converting a second reference voltage to a fourth frequency signal corresponding to the second reference voltage; converting the fourth frequency signal into a fourth digital signal corresponding to the frequency of the fourth frequency signal; and comparing the third digital signal to the fourth digital signal to produce a digital feedback signal.

The method may further include, during operation of the DC-DC converter: measuring a current sense voltage across the inductor; and computing a load current flowing through a load coupled to an output of the DC-DC converter in accordance with the measured current sense voltage and the computed resistance.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
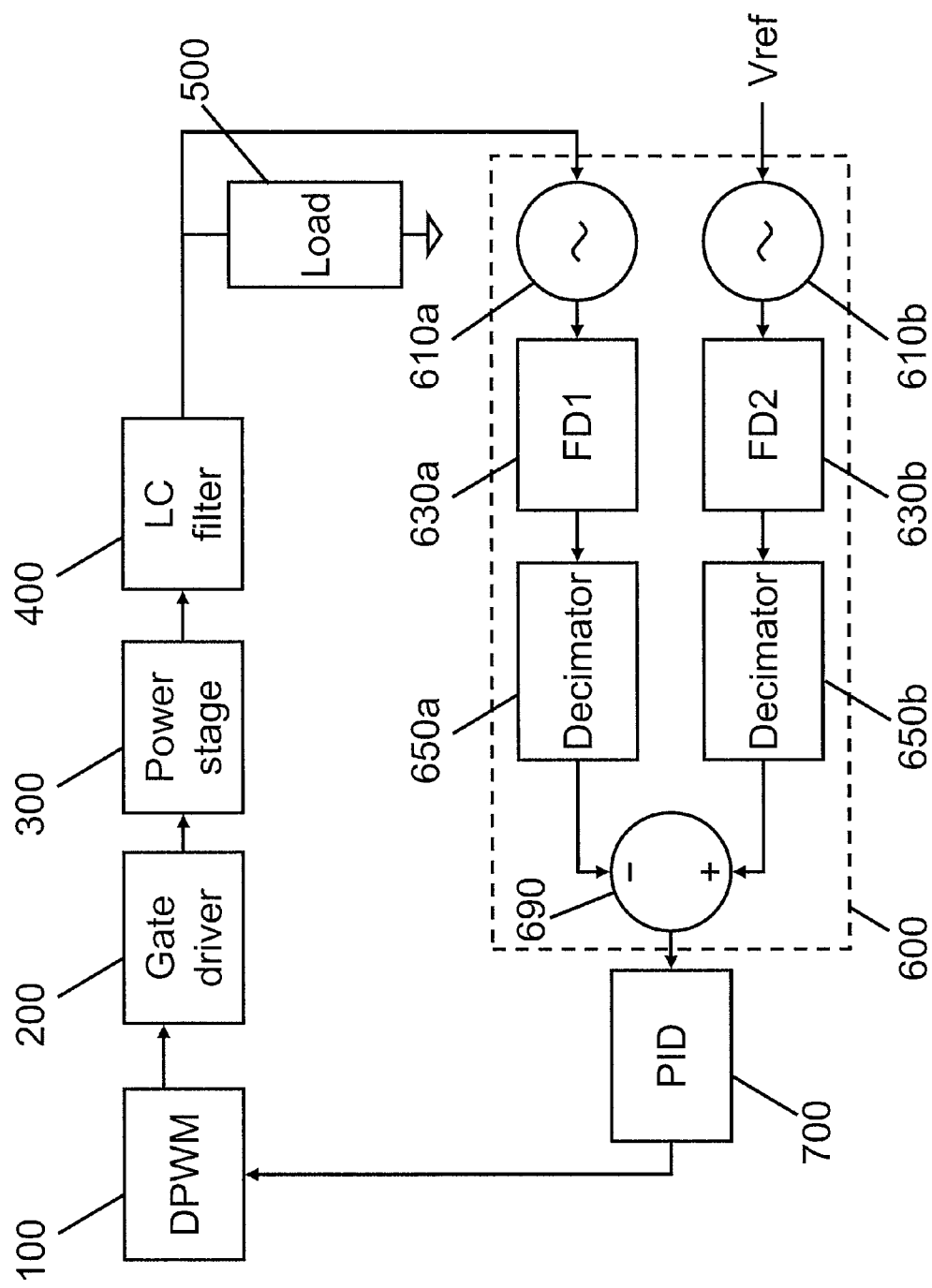
FIG. 1 is a block diagram illustrating a DC-DC converter according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Lossless load current sensing is a desirable feature of current or voltage mode controlled DC-DC converters. Current sensing can be used for short circuit detection, multi-stage converter load balancing, thermal control, and load independent control of DC-DC converters. In addition, current sensing techniques have recently used the existing inductor series resistance (DCR) instead of a separate current sensing resistor due to the reduced complexity and reduced losses associated with such circuits.

As such, accurate measurements of the DCR ($R_{DCR}$) and the inductance (L) of an inductor are important to provide for proper control of DC-DC converters. However, in certain usage environments, the inductance and the DCR of the inductor may vary and/or drift over time. For example, space-borne DC-DC circuits may be exposed to radiation (e.g., total ionizing dose or galactic cosmic rays) which may cause temporary perturbations of the output signal or permanent drifts of the electrical parameters of components in the circuit. As another example, components of DC-DC converters used in automotive or aerospace applications may also have component values (e.g., resistances and inductances) which may drift due to exposure to heat or changes in temperature. On the one hand, the temporary variation in the output voltage can be filtered out due to the digital implementation. On the other hand, drift of the components may be tracked using current measurements.

Embodiments of the present invention are directed to a digitally controlled DC-DC converter which includes a built-in self-test (BIST) feature to measure the DCR ($R_{DCR}$) and the inductance (L) of the inductor. The BIST feature may be used to obtain a digital measurement of the DCR and the inductance of the inductor during start-up, thereby allowing more accurate load current sensing and tuning of the driving waveforms to match the actual values of components of the circuit. Embodiments of the present invention also include an offset independent inductor characterization, enabling a digital continuous lossless load current sensing scheme which may be used with voltage-mode or current-mode controlled converters, as well as multi-stage parallel converters.

FIG. 1 is a block diagram illustrating a DC-DC converter according to one embodiment of the present invention where the DC-DC converter is a digital PWM buck converter utilizing a first order sigma delta ($\Sigma\Delta$) based frequency discriminator to generate an accurate representation of an instantaneous frequency of a carrier signal. In other embodiments of the present invention, the digital control approach is not only limited to the buck topology; this approach may be used to build a boost converter or a buck-boost converter. The decimator and proportional-integral-derivative (PID) controller, which uses the error signal to derive the appropriate duty cycle for the pulse width modulator 100 may be off-chip or on-chip. When the decimator and PID controller are off-chip, they may be implemented using an FPGA, a separate integrated circuit, or other circuits as are well known in the art. The PID controller may implement control algorithms, broadly termed as "nonlinear control" or "adaptive control", which are well known to those of ordinary skill in the art and which take account of the load characteristics, thereby offering improved efficiency and reliability.

Figure 2A:
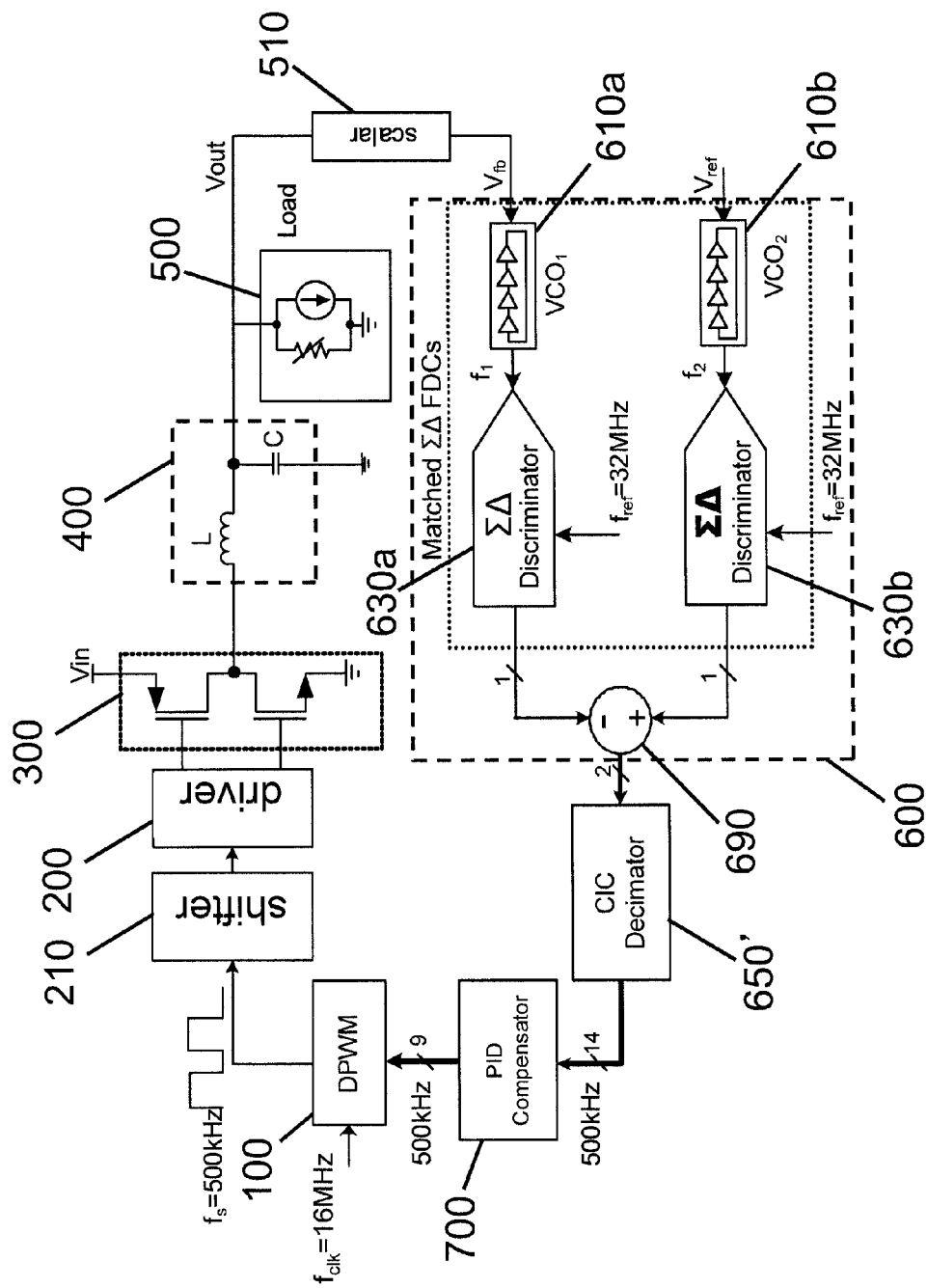
FIG. 2A is a block diagram illustrating a DC-DC converter according to one embodiment of the present invention.

FIG. 2A is a block diagram illustrating a DC-DC converter according to one embodiment of the present invention in more detail. The DC-DC converter includes a digital feedback circuit which converts a feedback voltage $V_{fb}$, (which is representative of the output voltage $V_{out}$) to a frequency using a voltage controlled oscillator (VCO) 610a (which may be referred to herein as the "first" VCO). The frequency signal is then converted to a single-bit sigma-delta modulated feedback signal using a $\Sigma\Delta$ (sigma-delta) discriminator 630a (which may be referred to herein as the "first" $\Sigma\Delta$ discriminator) which is compared to an analog voltage reference $V_{ref}$, which is sigma-delta modulated via a matched VCO 610b (which may be referred to herein as the "second" VCO) and a $\Sigma\Delta$ discriminator 630b (which may be referred to herein as the "second" $\Sigma\Delta$ discriminator). The 3-level first order $\Sigma\Delta$ noise shaped error signal is then decimated using a 2-stage comb (CIC) filter (or decimator) 650' to reduce the signal rate and the decimated signal is applied to the compensator (PID) 700 input. In other embodiments of the present invention (as shown, for example, in FIG. 1), first and second decimators 650a and 650b are used to reduce the signal rate prior to supplying the signal to the digital comparator 690. The PID compensator 700 (which may be a 9-bit PID compensator) calculates the duty cycle for reaching the target output voltage and supplies a duty cycle command to the digital PWM 100 to drive the PFET and NFET of the power stage 300 via a non-overlap dead-time gate driver 200.

Figure 2B:
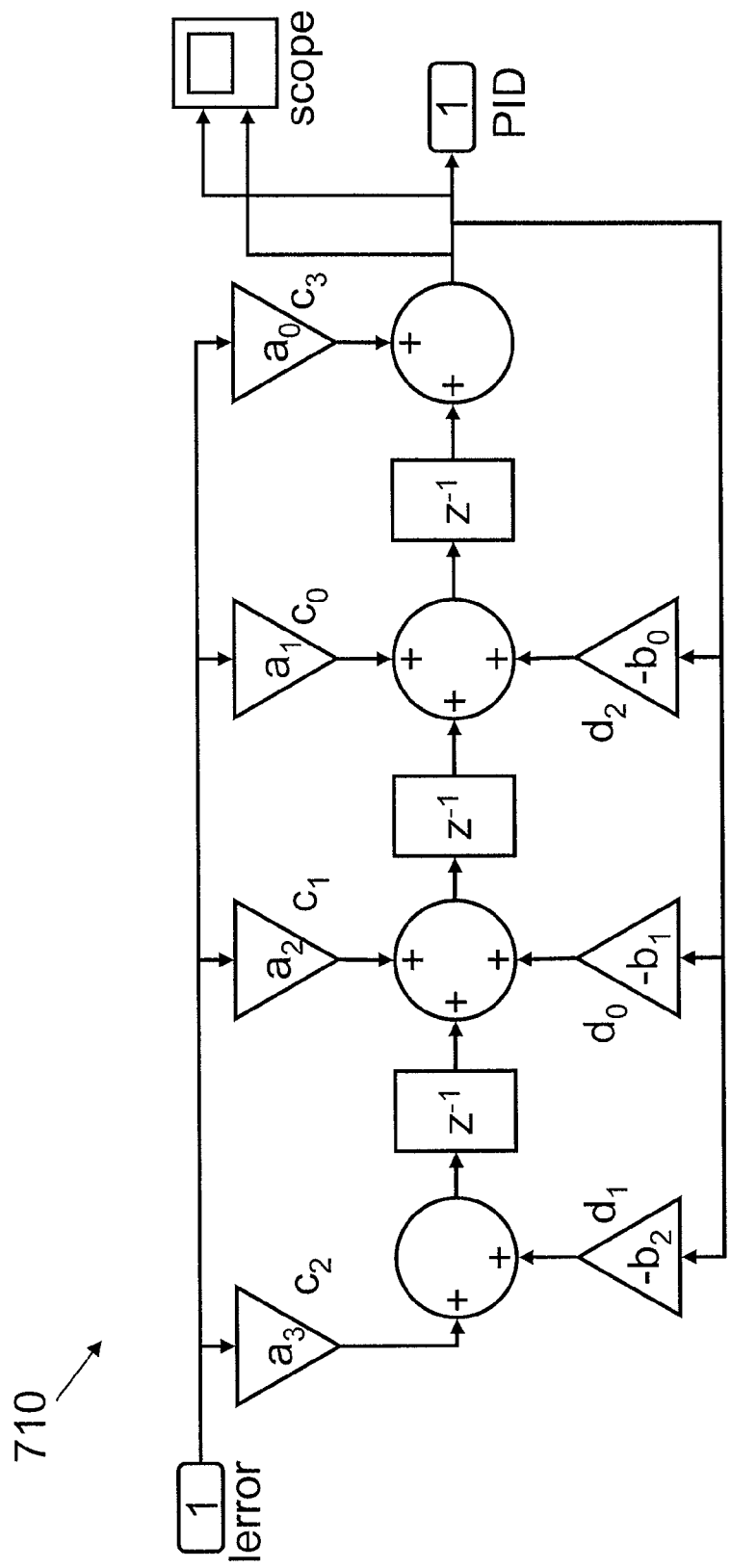
FIG. 2B is a block diagram illustrating an Infinite Impulse Response (IIR) filter according to one embodiment of the present invention.

FIG. 2B is a block diagram illustrating an Infinite Impulse Response (IIR) filter 710, which implements a PID compensator 700, according to one embodiment of the present invention. The PID controller can also be implemented as a simple look-up table, emulating the response of the IIR filter.

Although the circuit shown in FIG. 2A includes a single gate driver stage 200, embodiments of the present invention are compatible with multiple gate driver stages and power FETs, including external ones. In addition, FIG. 2A illustrates the use of a buck converter, which are generally well known to one of ordinary skill in the art. However, embodiments of the present invention are not limited thereto and may be used with other DC-DC converters such as a boost converter or a buck-boost converter.

According to one embodiment of the present invention, in the digital comparison block 600, a reference voltage $V_{ref}$ is compared to the output voltage $V_{out}$ using a digital feedback circuit implementing a digitally intensive scheme based on voltage-to-frequency conversion, instead of using a full analog-to-digital converter (ADC). In some embodiments the output voltage $V_{out}$ is scaled using a scalar 510 (e.g., a resistor divider) to produce a feedback voltage $V_{fb}$ and the reference voltage $V_{ref}$ is compared to the feedback voltage $V_{fb}$. The reference voltage and output voltage drive matched Voltage Controlled Oscillators (VCOs) 610a and 610b (which will be referred to generically as 610), which output signals having frequencies corresponding to the voltages supplied. The generated frequencies are measured using frequency discriminators (e.g., (digitally intensive Delta-Sigma frequency discriminators) 630a and 630b (which will be referred to generically as 630) and the measured frequencies are compared at a digital comparator 690.

Embodiments of the present invention which use time/frequency based digitization may be substantially independent of process variations because VCO paths are matched. In addition, frequency domain ADC circuits can be implemented in much smaller die areas than comparable voltage mode ADC circuits, are easily combined with digital processes, and can be ported to different fabrication processes easily. In addition, the use of a digital scheme avoids the additional design requirements and circuit sensitivities associated with analog comparator offset and analog ramp linearity. However, embodiments of the present invention are not restricted to the above described use of VCOs and frequency discriminators to obtain and compare a digital representation of the output voltage with a reference value. For example, a fully analog loop filter based ADC can also be used for this purpose. Other suitable ADC approaches include two-step and sub-ranging ADCs.

The Digital Pulse Width Modulator (DPWM) 100 derives its output signal (which is supplied to the gate driver 200 through a level shifter 210 to control the power stage 300) from a segmented coarse/fine scheme where the fine delay is generated using a high accuracy phase locked digitally controlled ring oscillator, e.g., a delay locked loop (DLL) 110 (see, e.g., FIG. 3), within the DPWM and the coarse delay is supplied from a counter driven by a clock signal (e.g., $f_{clk}$ as shown in FIG. 2). The coarse delay is set by a simple counter driven by $f_{clk}$. The coarse delay controls the majority of the output set voltage. In the proposed figure, the 3 most significant bits control the coarse delay and thus the coarse delay controls the output voltage at increments of $\frac{1}{8}^{th}$ of the full output range. As such, the output duty cycle according to embodiments of the present invention is substantially independent of process variations and ambient temperature, which would have affected the duty cycle of an open loop analog oscillator. The coarse/fine approach significantly reduces the size of the delay line and reduces the overall clock while providing high duty cycle resolution. Locking the DLL to the clock improves the monotonicity of the output, which can be difficult to achieve in segmented approaches which use open loop feedback circuits.

In addition, embodiments of the present invention also include a load and filter characterization engine, enabling auto calibration and built-in self-test of the load and filter, which will be illustrated and described below in reference to, for example, FIG. 6.

Figure 3A:
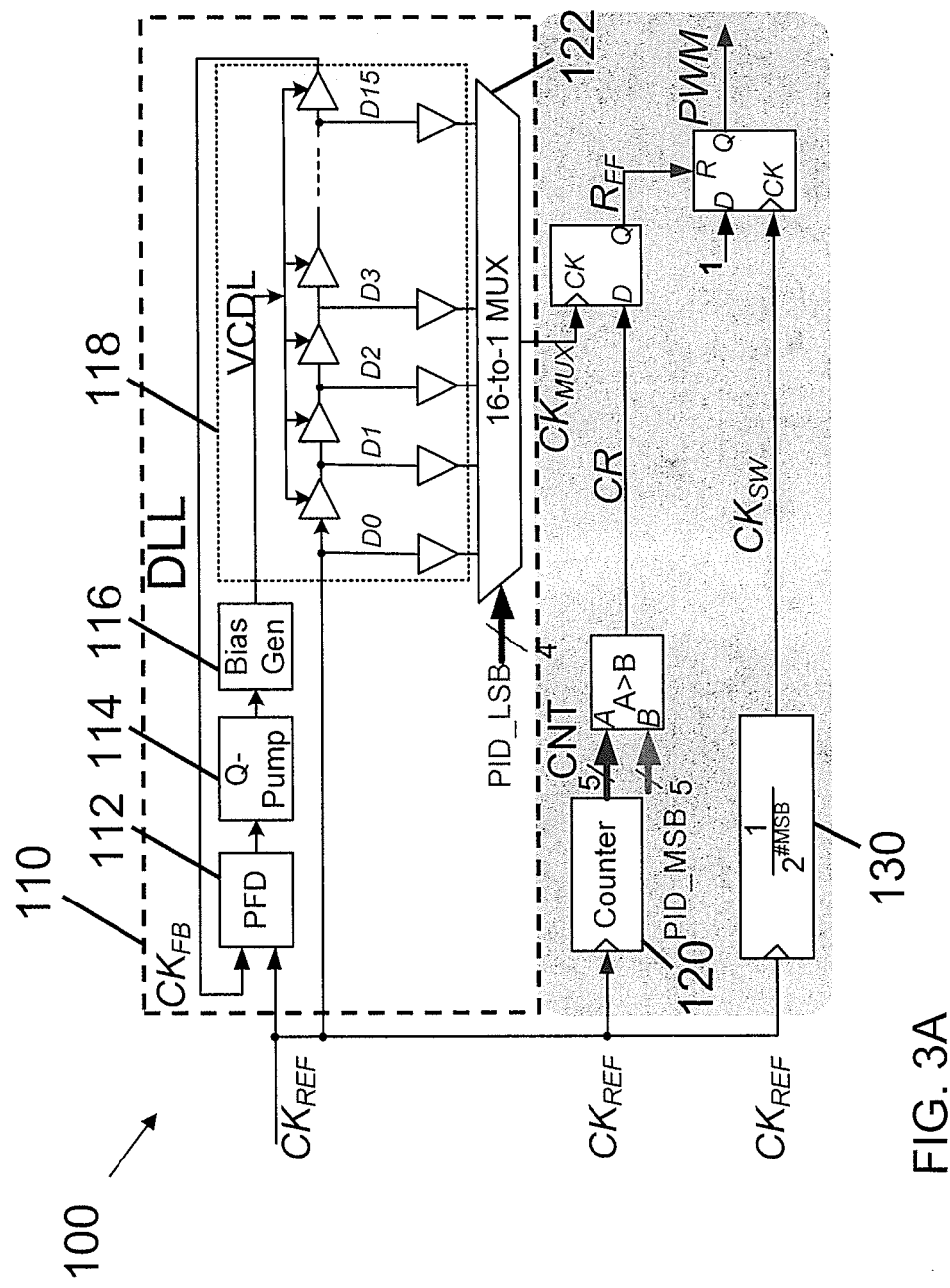
FIG. 3A illustrates a digital pulse width modulator according to one embodiment of the present invention.
Figure 3B:
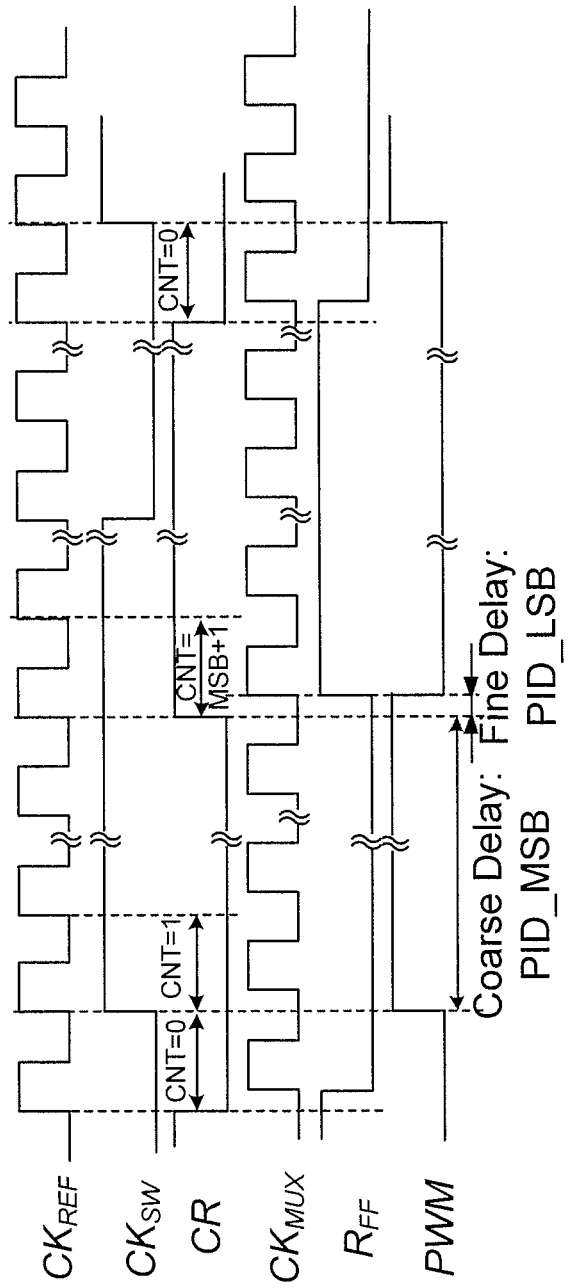
FIG. 3B is a diagram illustrating various driving waveforms labeled in FIG. 3A, according to one embodiment of the present invention.

FIG. 3A illustrates a DPWM 100 according to one embodiment of the present invention. FIG. 3B is a diagram illustrating various driving waveforms labeled in FIG. 3A, according to one embodiment of the present invention. According to this embodiment, the DPWM 100 is configured to have its 5 most significant bits (5 bits MSB) controlled by a counter 120 and its 4 least significant bits (4 bits LSB) controlled by the DLL circuit 110. However, in other embodiments of the present invention, various other numbers of bits may be controlled by the counter 120 or the DLL circuit 110, depending on the resolution desired for the application. The clock frequency $f_{clk}$ is supplied to a frequency divider 130 to generate a switching frequency $f_s$. According to one embodiment, the switching frequency is approximately 500 kHz. The clock frequency $f_{clk}$ is reduced from $f_{clk}=*2^n*f_s$ to $f_{clk}=2^{MSBs}*f_s$, where f is switching frequency and n is the PWM resolution. Such a circuit is suitable for high resolution and high switching frequency applications.

A 16 MHz clock $f_{clk}$ (e.g., CLK_16M) is used to generate the pulse with a 1 µs switching frame. A 4 bit counter 120 from the 16 MHz clock generates the coarse count CNT (i.e. 0-15 clock edges). The coarse count CNT is compared with the most significant bits supplied by the PID controller (PID_MSB) to control the time period of the coarse count COMP_OUT. A 16-stage delay line 118 divides the clock pulse into 16 equal time periods. A 16-to-1 mux 122 selects the appropriate tap from the delay line 118 in accordance with the least significant bits supplied by the PID controller PID_LSB. The time period from the coarse count COMP_OUT is summed with the time period DLL_OUT from the delay line 118 to achieve 8 bits of output resolution FF_RST. The combined coarse and fine delay signals, in turn, control the width of the pulses of the output signal PWM (see, e.g., "Coarse Delay" and "Fine Delay" in FIG. 3B). Monotonicity is substantially improved or guaranteed with this scheme over equivalent analog circuits, as is independence from process variation and ambient temperature. Higher resolution is possible by increasing the clock frequency and number of bits in the coarse counter and/or increasing the number of stages in the DLL.

Figure 4A:
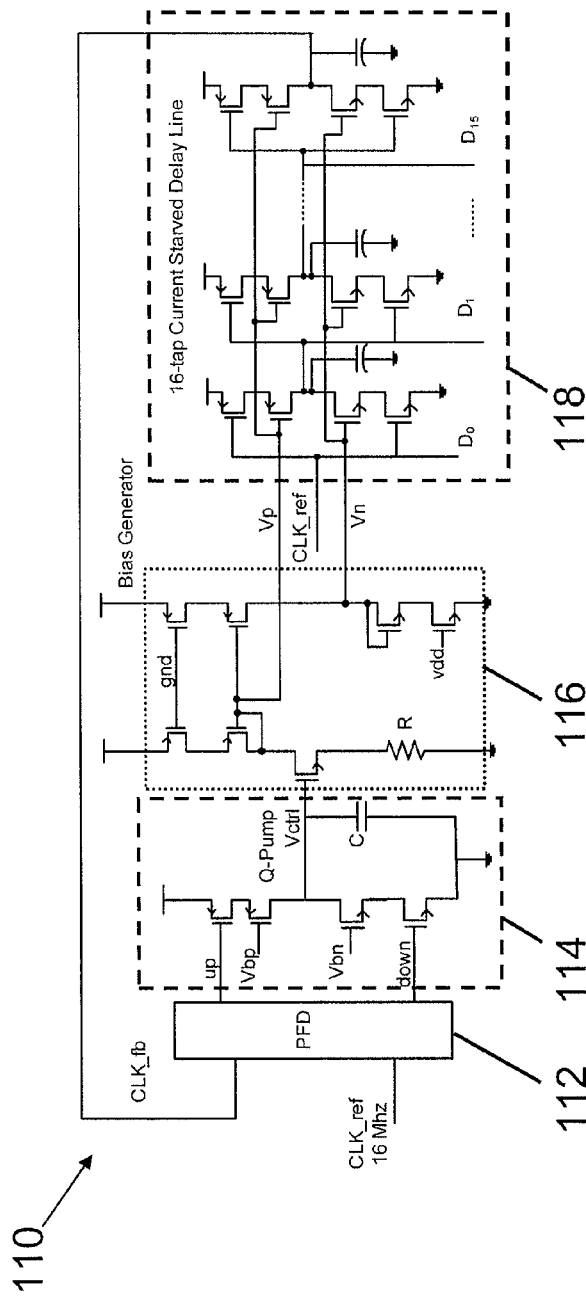
FIG. 4A is a circuit diagram illustrating a delay locked loop (DLL) according to one embodiment of the present invention.

A DLL circuit 110 according to one embodiment of the present invention is illustrated in FIG. 4A. A phase frequency detector (PFD) 112 receives a reference signal $f_{ref}$(CLK_ref) and a feedback signal CLK_fb. The PFD supplies an "up" signal and a "down" signal to the Q-pump 114, which supplies a Vctrl signal to the bias generator 116, which, in turn, supplies Vp and Vn signals to the delay line 118. In some embodiments of the present invention, for Vctrl from 0~Vdd, the DLL does not lock in a multiple periods state. In addition, the capacitors and bias can be tuned to calibrate for process variations and the initial value of Vctrl can be set and monitored. As an alternative approach, instead of an analog phase-frequency detector, a digital phase detector followed by a digital loop filter can also be used to control this DLL. This approach is termed all-digital DLL (ADDLL) in the literature and the delay line is controlled digitally.

The proposed DLL should be stable across all temperature and voltage ranges. It should not lock to higher harmonics of the input frequency. These properties are desired for most of the DLL applications. A start-up calibration can be used to ensure that the delay through the delay chain is within one clock cycle. The delay line is usually designed to have minimum temperature impact by biasing it with an inversely proportional temperature coefficient current source. In addition, in embodiments of the present invention, voltage-versus delay characteristics of the delay line are to be carefully designed so that the DLL does not lock to the higher harmonics across all process, temperature, and voltage variations.

Figure 4B:
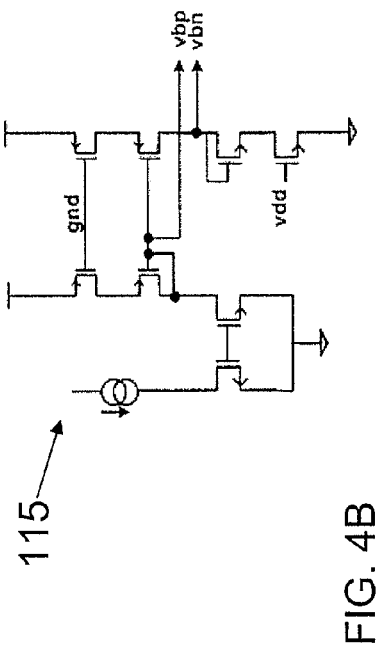
FIG. 4B is a current mirror configured to supply a bias voltage to a DLL according to one embodiment of the present invention.

The delay line is current controlled, and the delay line should be functional even upon start up when the control voltage can be zero. As such, according to one embodiment, a current mirror 115 as shown in FIG. 4B supplies voltages vbp and vbn to Q-pump 114 to supply a bias for the delay line 118 upon start-up.

Figure 5:
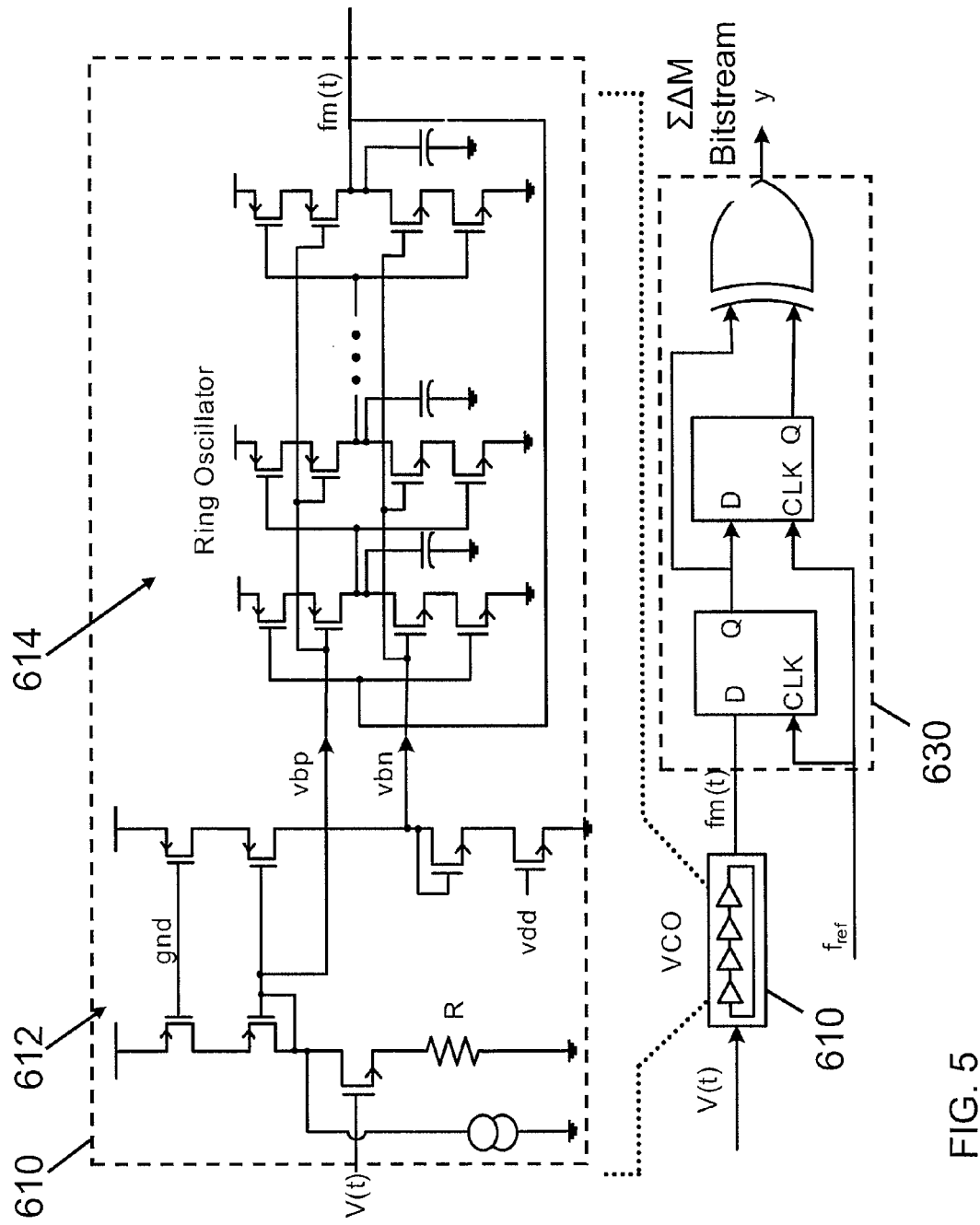
FIG. 5 is a circuit diagram illustrating a voltage controlled oscillator (VCO) and a frequency discriminator according to one embodiment of the present invention.

FIG. 5 is a circuit diagram illustrating a voltage controlled oscillator (VCO) 610 (e.g., VCO 610a or 610b as shown in FIG. 2) and a frequency discriminator 630 (e.g., frequency discriminator 630a or 630b as shown in FIG. 2) according to one embodiment of the present invention. The VCO 610 illustrated in FIG. 5 includes a current mirror 612 and a ring oscillator 614, but other embodiments of the present invention may use a VCO having a variety of alternative structures, as would be understood by one of ordinary skill in the art.

The VCO 610 provides an output signal fm(t) which depends on the voltage supplied to the VCO 610. The output signal fm(t) is supplied to the frequency discriminator 630 in which it is compared with a reference frequency $f_{ref}$ and converted into a digital representation thereof, then output as ΣΔM Bitstream y.

Referring again to FIG. 2, the outputs of the discriminators 630a and 630b (e.g., the ΣΔM Bitstreams from each of the discriminators) are supplied to a digital comparator 690, and the output of the digital comparator is supplied to a CIC decimator (e.g., a 2-stage comb filter) 650', which closes the feedback loop by supplying a digital feedback signal to PID compensator 700 which is configured to control the DPWM 100.

As such, embodiments of the present invention provide a digital feedback signal to control the output voltage of the DC-DC converter, thereby improving reliability and output uniformity over analog feedback approaches by reducing the effect of process variation and changes due to environmental conditions.

According to one aspect of embodiments of the present invention, embodiments of the present invention may be operated in a built-in self-test (BIST) mode to measure an inductance (L) and a DC resistance (DCR) of a device-under-test (DUT), e.g., a power inductor, in the converter circuit.

Figure 6A:
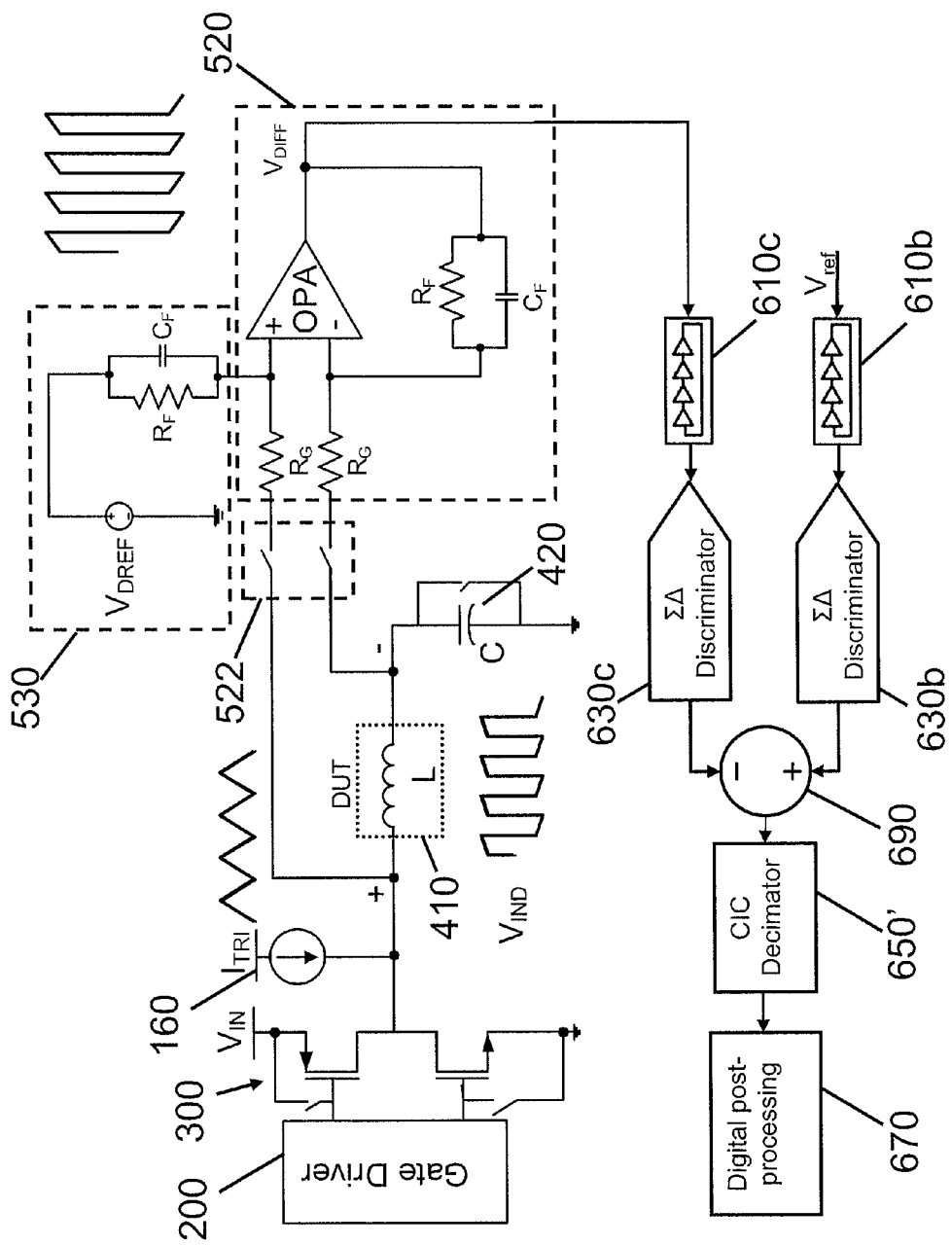
FIG. 6A is an annotated circuit illustrating a readout circuit for measuring a voltage across the DUT of a DC-DC converter according to one embodiment of the present invention.

FIG. 6A is an annotated circuit illustrating a readout circuit for measuring a voltage across the DUT of a DC-DC converter as shown in the embodiment of FIG. 2. For the sake of convenience, the digital feedback portion of the circuit of FIG. 2 (e.g., the scalar 510, the VCO 610a, and the ΣΔ discriminator 630a) is not repeated in FIG. 6A, and a triangular current generator $I_{TRI}$ 160 and a read-out chain (including an op-amp circuit 520, a VCO, and a sigma-delta discriminator) are included to illustrate components for operating the DC-DC converter in BIST mode. Switches 522 are coupled between the read-out chain and the device under test to disconnect the read-out chain from the rest of the circuit when the read-out chain is not in use.

Figure 6B:
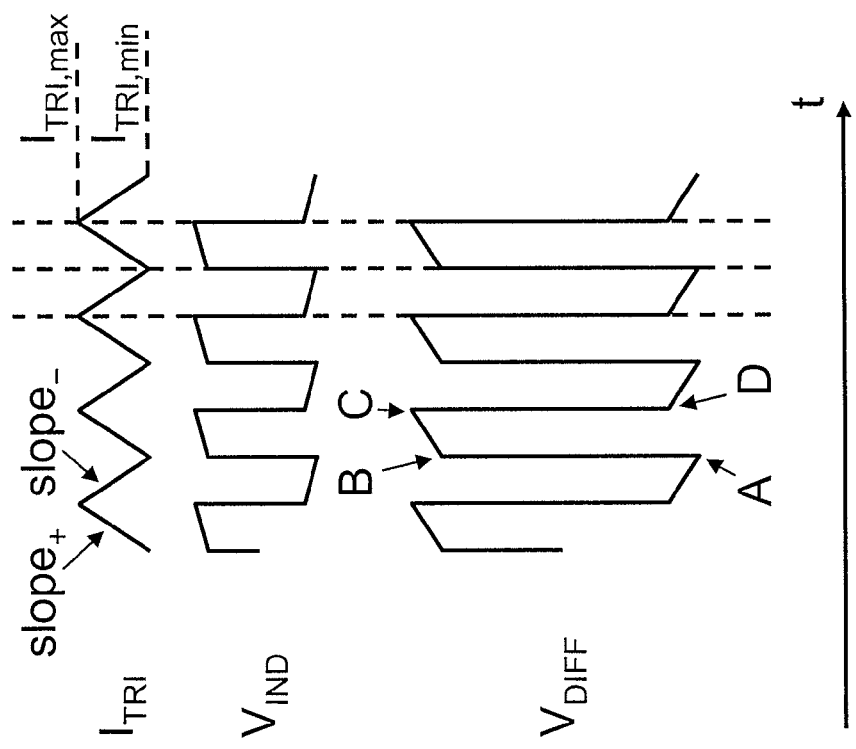
FIG. 6B is a waveform diagram illustrating voltage and current waveforms at various portions of the circuit illustrated in FIG. 6A.

FIG. 6B is a waveform diagram illustrating voltage and current waveforms at various portions of the circuit illustrated in FIG. 6A.

Referring to FIG. 6A, according to one embodiment, the triangular current generator $I_{TRI}$ 160 supplies a triangular waveform to the device-under-test (DUT) 410, which is an inductor having inductance L, and is part of the LC circuit 400. The inductance of the device-under-test 410 can be determined based on the magnitude of the voltage across the inductor when a time varying current is applied through the inductor. In particular, the time varying voltage across a real inductor is given by $$v(t) = L\frac{di(t)}{dt} + Ri(t),$$

where i(t) is the current passing through the inductor, L is the inductance of the inductor, and R (or $R_{DCR}$) is the resistance of the inductor.

The voltage across the inductor $V_{IND}$ is amplified by a first-order low-pass filter (or a lossy integrator) 520 which includes an operational amplifier OPA with input resistors $R_G$ and a feedback capacitor $C_F$ in parallel with a feedback resistor $R_F$. The input resistors $R_G$ have a resistance large enough such that the current flowing through them is substantially ignorable compared to $I_{TRI}$. The feedback capacitor $C_F$ and the feedback resistor $R_F$ can filter the ringing high frequency signal generated by the inductance and the parasitic capacitance of the power stage.

According to other embodiments of the present invention, higher order filters such as ones that utilize Sallen-Key or Tow-Thomas biquad topologies may be used in place of the first order low pass filter 520.

In addition, in some embodiments of the present invention, a DC offset control circuit 530 may be used to set the DC level of the output difference voltage $V_{DIFF}$. The DC offset control circuit 530 includes a voltage source $V_{DREF}$ coupled to the non-inverting input of the operational amplifier OPA through a resistor in parallel with a capacitor, the resistor and capacitor having values respectively matching values of the feedback resistor $R_F$ and the feedback capacitor $C_F$.

As such, the resistance R (or $R_{DCR}$) of the inductor is proportional to the slope of the upper and lower portions of the waveform (e.g., between point B and C as labeled in FIG. 6B). For the sake of convenience, the slope of the upper end and lower end portions of the waveform will be referred to as the "slope" of the voltage waveform. In addition, the inductance L of the inductor is proportional to the voltage across the inductor after subtracting the effect of the resistance of the inductor (e.g., the average voltage between points B and C). For sake of convenience, this voltage across the inductor after subtracting the resistance will be referred to herein as the "magnitude" of the voltage waveform.

The output voltage difference $V_{DIFF}$ is processed through substantially the same processing path as the feedback signal during normal operation. The voltage difference signal $V_{DIFF}$ is passed through a VCO 610c (which may be referred to herein as the "third" VCO) to be converted into a frequency signal and converted to a digital representation thereof by a ΣΔ discriminator 630c (which may be referred to herein as the "third" ΣΔ discriminator). The digitized representation of the voltage difference signal $V_{DIFF}$ is compared to a frequency signal corresponding to reference voltage $V_{ref}$ as output by a matched VCO 610b coupled to the ΣΔ discriminator 630b. The reference voltage $V_{ref}$ may have different values during normal operation and during BIST operations. The digital output of the digital comparator 690 is then decimated by the CIC Decimator 650', and the resulting bitstream is supplied to a digital post processing component 670, which may supply a digital signal to the PID controller 700 (see, e.g., FIG. 2) in order to modify the driving waveforms in accordance with the inductance and resistance characteristics of the inductor 410.

Figure 7:
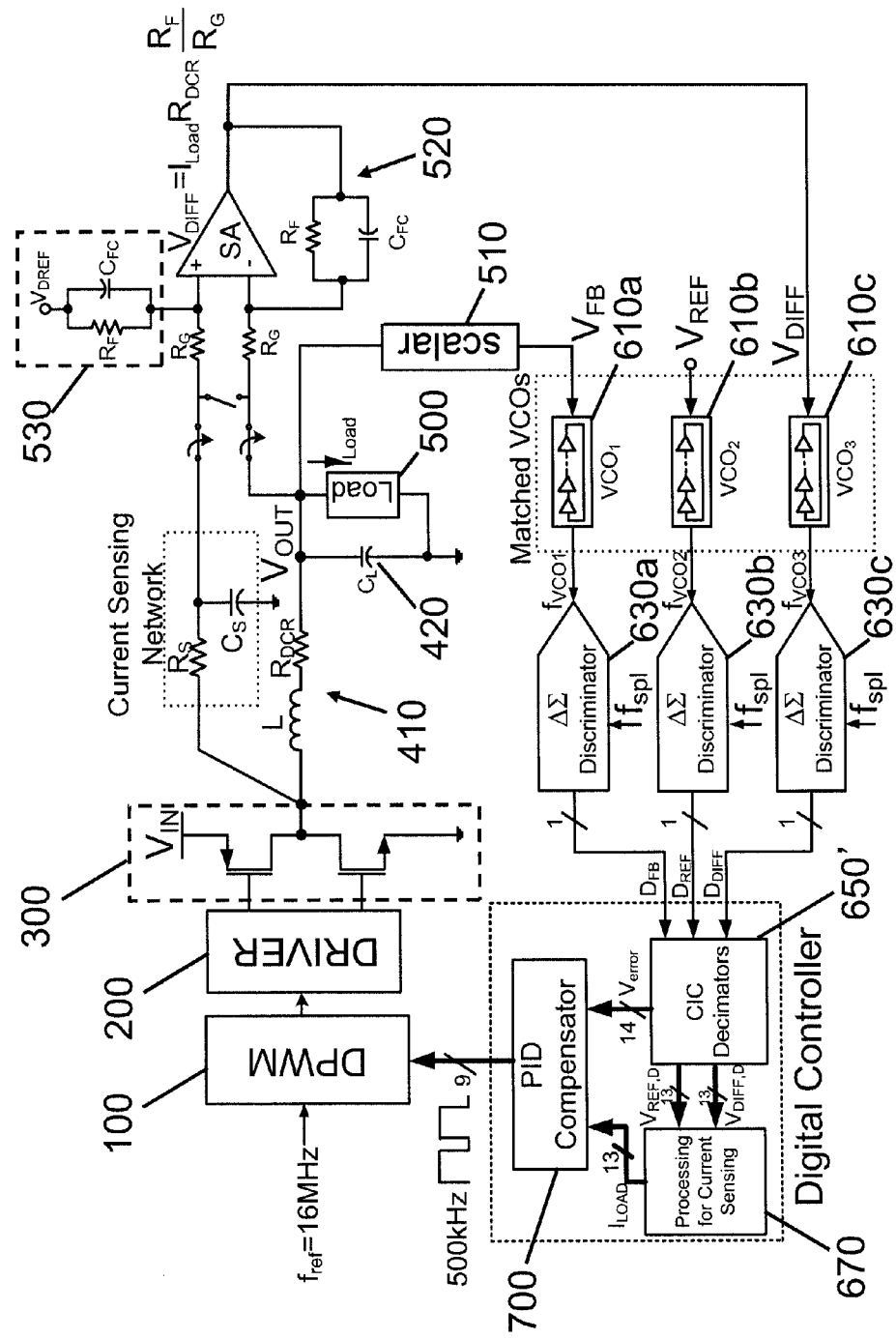
FIG. 7 is a block diagram illustrating a DC-DC converter according to one embodiment of the present invention.

Referring to FIG. 7, an adaptive DC-DC converter according to embodiments of the present invention includes both the digital feedback circuit (including the scalar 510, the first VCO 610a, and the first ΣΔ discriminator 630a) illustrated, for example, in FIG. 2A and the readout circuit (including the op-amp circuit 520, the third VCO 610c, and the third ΣΔ discriminator 630c) illustrated, for example, in FIG. 6A. The inductance and DCR values of the inductor measured by the readout circuit can be used to fine tune the digital controller coefficients in the PID controller 700.

According to one embodiment, the IIR transfer function is:

$$Y = \frac{a_0 Z^3 + a_1 Z^2 + a_2 Z + a_3}{Z^3 + b_0 Z^2 + b_1 Z + b_2} X$$

This IIR transfer function determines the phase and amplitude margin, hence the stability conditions of the system. The parameters that determine the un-compensated response of the system are switching frequency, load inductor, capacitor, and their DCR and ESR respectively. Once these component values are determined, one can use open loop phase margin multiplied by the compensator response, and modify the IIR coefficients so that the system is stable. Also, the DCR value may be used to normalize and to measure the load current. In harsh environment applications where the characteristics of external components can degrade (such as in automotive applications or in outer space), the controller can update these coefficients to compensate for the change or degradation of the external components.

Figure 8:
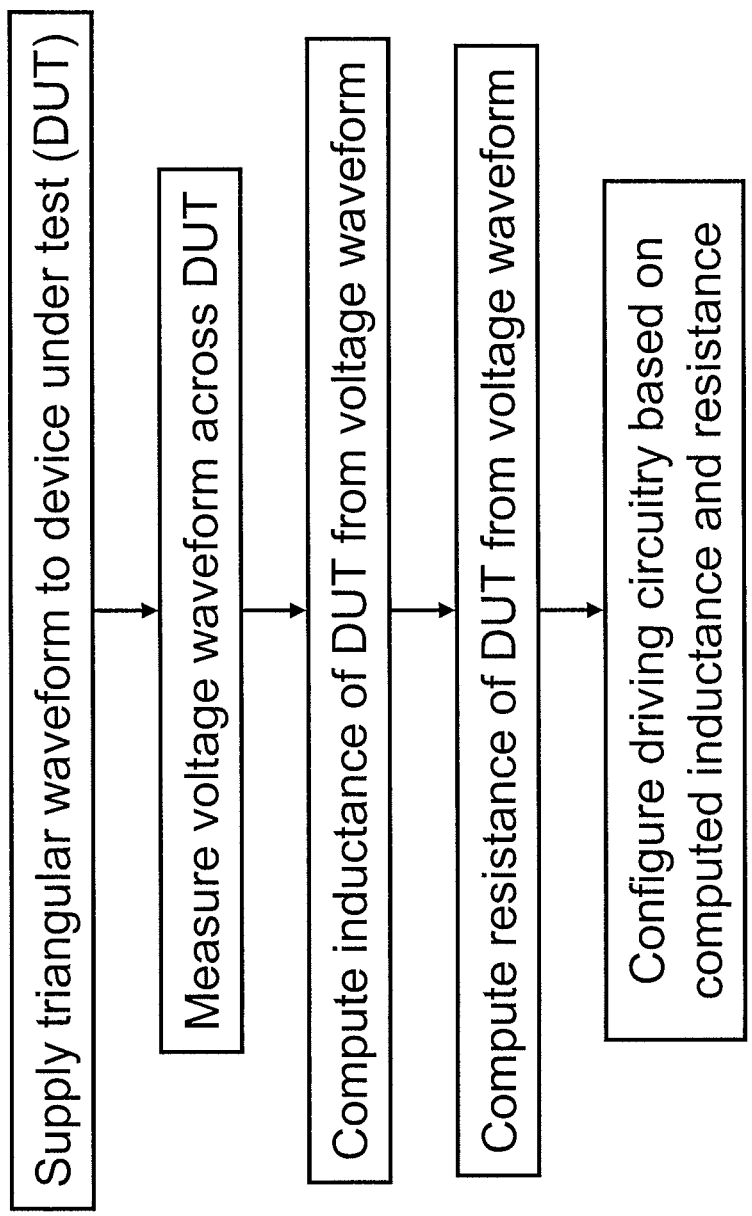
FIG. 8 is a flowchart illustrating a method of operating a DC-DC converter according to one embodiment of the present invention.

FIG. 8 is a flowchart illustrating a method of operating a DC-DC converter according to one embodiment of the present invention, the method including: during system power up, supplying a triangular current waveform to a device-under-test (e.g., an inductor), measuring a voltage waveform across the device-under-test, computing an inductance based on the voltage waveform (as described above), computing a resistance from the slope of the voltage waveform (as described above), supplying the measured inductance and resistance to the controller, and adjusting the driving waveforms in accordance with the measured inductance and resistance.

Figure 9:
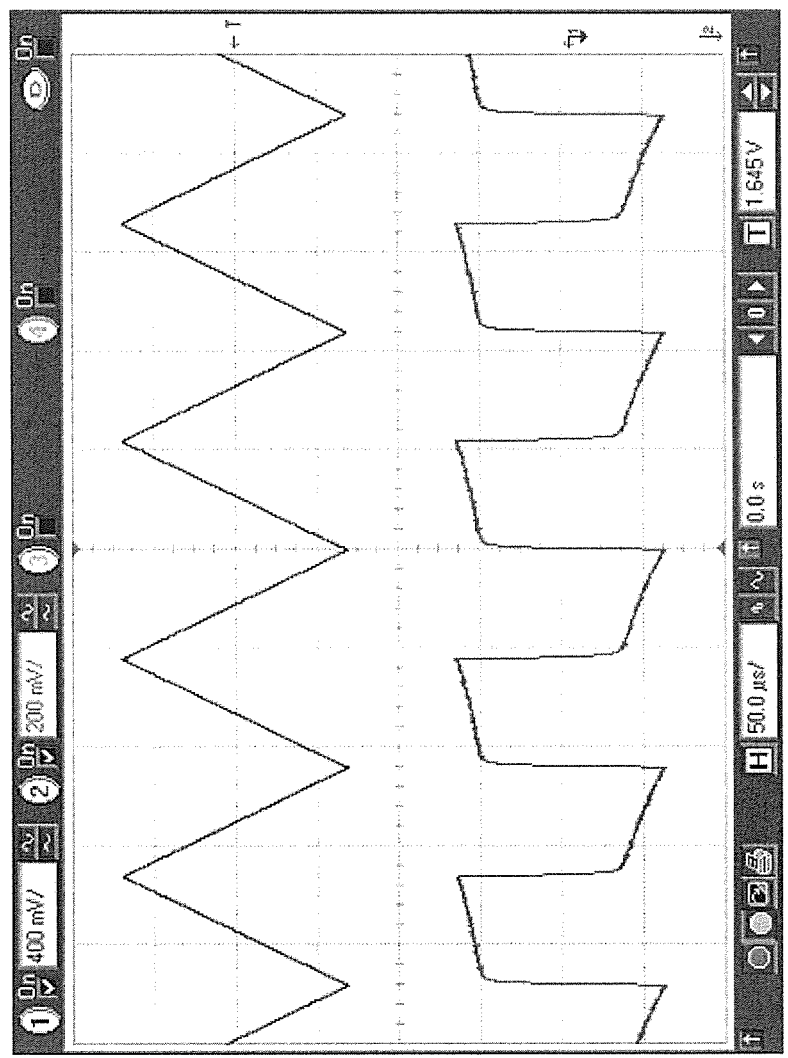
FIGS. 9 and 10 are captures from an oscilloscope illustrating the operation of a BIST circuit according to one embodiment of the present invention to characterize a 10.90 µH inductor and a 22.34 µH inductor, respectively.
Figure 10:
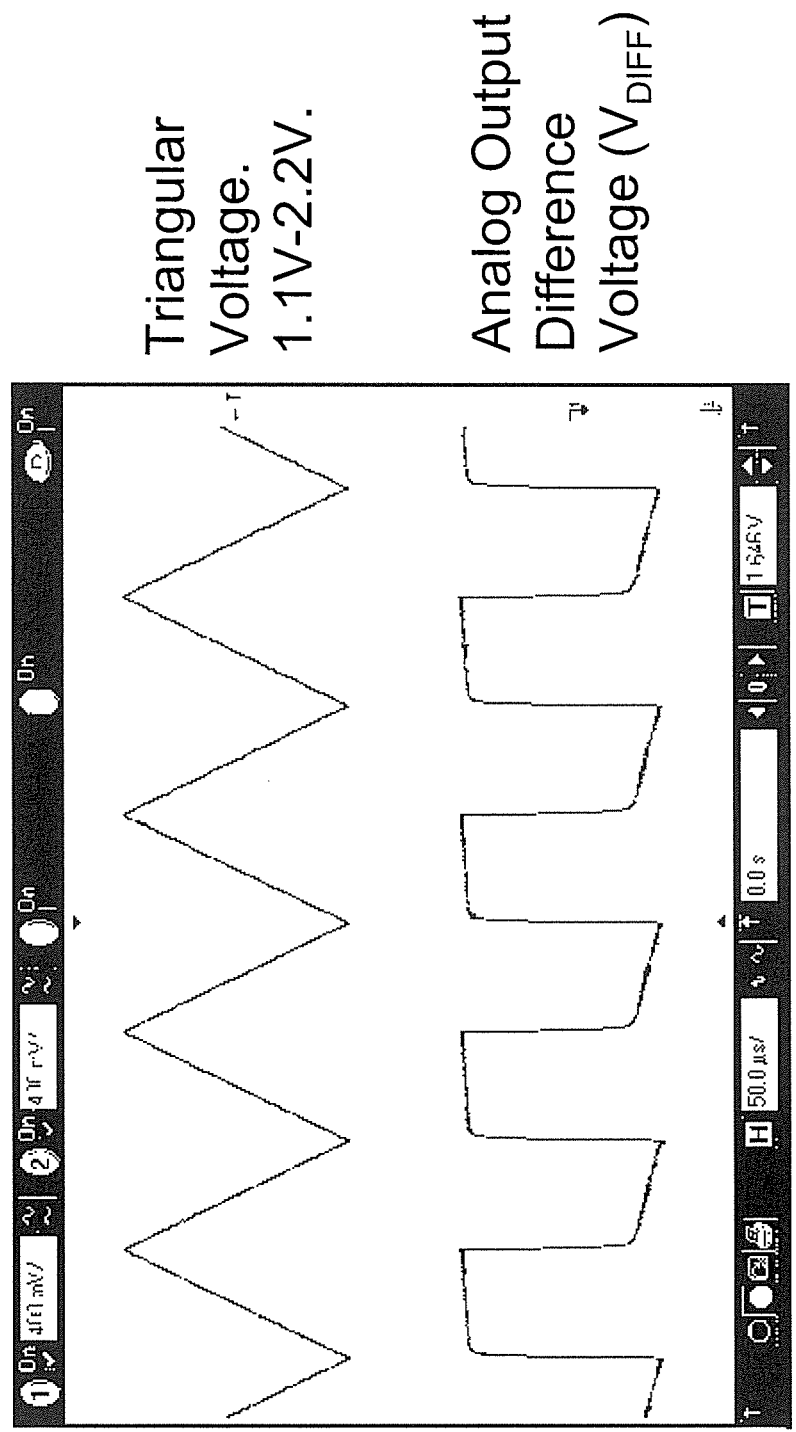

FIGS. 9 and 10 are captures from an oscilloscope illustrating the operation of the BIST circuit to characterize a 10.90 μH inductor and a 22.34 μH inductor, respectively. The upper trace shows a triangular voltage controlling a V to I converter to apply a triangular current when operating the BIST, and the lower trace illustrates the analog output difference voltage $V_{DIFF}$ which corresponds to the voltage across the inductor while the triangular voltage waveform is applied.

Figures 11A, 11B, 11C:
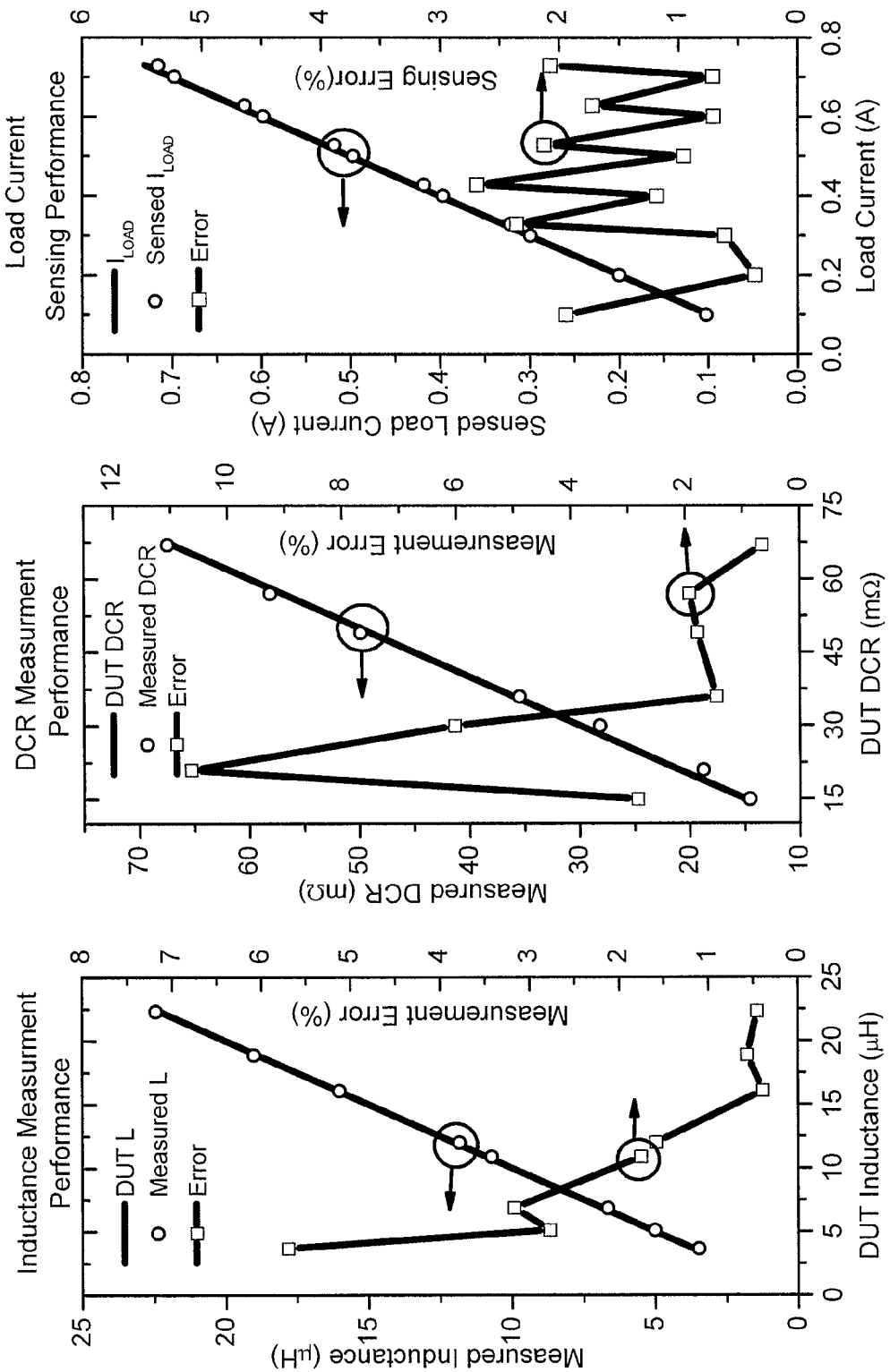
FIG. 11A is a graph comparing the inductance measurements provided by a BIST circuit according to one embodiment of the present invention to known inductance values.
FIG. 11B is a graph comparing the resistance measurements provided by a BIST circuit according to one embodiment of the present invention to known resistance values.
FIG. 11C is a graph comparing load current sensing measurements as measured by a circuit according to one embodiment of the present invention and actual load currents.

FIG. 11A is a graph comparing the inductance measurements provided by the BIST circuit described above to known inductance values. The measured inductances (circles) were generally quite close to the actual inductances (straight line) and the measurement error (squares) generally remained below 6% and decreased at higher inductances.

Similarly, FIG. 11B is a graph comparing the resistance measurements provided by the BIST circuit described above to known resistance values. The measured DCR values (circles) were generally quite close to the actual resistances (straight line) and the measurement error (squares) generally (with the exception of the second data point at about 20 mΩ) remained below 4%.

FIG. 11C is a graph comparing load current sensing measurements as measured by the circuit and actual load currents. The sensed load current (circles) were generally quite close to the actual current (straight line) and the sensing error (squares) generally below about 3%.

Embodiments of the present invention are also configured to measure the current flowing through the load 500 by using the DC resistance (DCR) of the inductor 410 in the circuit. The DCR of the inductor 410 was measured as described above, and the voltage across the inductor 410 can be measured using the same readout circuitry shown, for example, in FIG. 6A. Dividing the measured voltage by the measured DCR of the inductor provides a measurement of the current flowing through the load, which may be computed by the digital post-processing unit 670. As such, short circuit detection and more precise multi-stage converter load balancing, thermal control, and load independent control are possible using the measured DCR of the inductor.

According to some embodiments of the present invention, the digital post-processing unit 670 may be coupled to an external port for interfacing with an outside device for reporting information such as the measured load current.

As such, embodiments of the present invention are directed to a DC-DC converter capable of measuring the inductance of an inductor of the circuit and using the measured inductance to adjust the driving waveforms supply to perform the DC-DC conversion. In addition, DC-DC converters according to embodiments of the present invention are capable of measuring the DC resistance of an inductor to provide current sensing capabilities which remain accurate even if the resistance characteristics of the inductor change over time. Furthermore, embodiments of the present invention are directed to a system utilizing a digital voltage feedback signal, thereby improving robustness to process variations and environmental conditions.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A DC-DC converter configured to generate a DC output voltage, the DC-DC converter comprising:
   a digitally controlled pulse width modulator configured to control a switching power stage to supply a varying voltage to an inductor; and
   a digital voltage feedback circuit configured to control the digitally controlled pulse width modulator in accordance with a feedback voltage corresponding to the DC output voltage, the digital voltage feedback circuit comprising:
      a first voltage controlled oscillator configured to convert the feedback voltage into a first frequency signal and to supply the first frequency signal to a first frequency discriminator;
      a second voltage controlled oscillator configured to convert a reference voltage into a second frequency signal and to supply the second frequency signal to a second frequency discriminator;
      a digital comparator configured to compare digital outputs of the first and second frequency discriminators and to output a digital feedback signal; and
      a controller configured to control the digitally controlled pulse width modulator in accordance with the digital feedback signal.

2. The DC-DC converter of claim 1, further comprising:
   a triangular current source coupled to the inductor; and
   a read-out circuit for measuring a voltage across the inductor, the read-out circuit comprising:
      a low-pass filter having a first terminal coupled to a first end of the inductor and a second terminal coupled to a second end of the inductor, the low-pass filter supplying an inductor voltage corresponding to the voltage across the inductor; and
      a third voltage controlled oscillator configured to convert the inductor voltage into a third frequency signal and to supply the third frequency signal to a third frequency discriminator, the third frequency discriminator being coupled to the digital comparator to compare the digital output of the second frequency discriminator and a digital output of the third frequency discriminators discriminator;
   wherein the controller is configured to measure an inductance of the inductor based on a magnitude of a voltage waveform of the inductor voltage, the voltage waveform being generated when a triangular current waveform is applied to the inductor, and
   wherein the controller is further configured to control the digitally controlled pulse width modulator in accordance with the measured inductance.

3. The DC-DC converter of claim 2, wherein the controller is further configured to measure a resistance of the inductor based on a slope of the voltage waveform of the inductor voltage.

4. The DC-DC converter of claim 3, wherein the controller is further configured to compute a magnitude of a current flowing through a load coupled to the DC output voltage, the magnitude of the current being computed in accordance with the voltage across the inductor and the measured resistance of the inductor.

5. The DC-DC converter of claim 2, wherein the low-pass filter is a first order low pass filter.

6. The DC-DC converter of claim 5, wherein the low-pass filter comprises:
an op-amp; and
a first feedback resistor and a first feedback capacitor coupled in parallel between an output of the op-amp and an inverting input of the op-amp.

7. The DC-DC converter of claim 6, further comprising a DC-offset control circuit, the DC-offset control circuit comprising:
a second feedback resistor and a second feedback capacitor coupled in parallel between a reference voltage source and a non-inverting input of the op-amp.

8. The DC-DC converter of claim 2, wherein the low-pass filter is a Sallen-Key or Tow-Thomas biquad filter.

9. The DC-DC converter of claim 1, wherein the DC-DC converter is a buck converter, a boost converter, or a buck-boost converter.

10. The DC-DC converter of claim 1, further comprising a CIC decimator coupled between the digital comparator and the controller and configured to decimate the digital feedback signal received from the digital comparator and to supply the decimated digital feedback signal to the controller.

11. The DC-DC converter of claim 1, further comprising a plurality of CIC decimators, each of the CIC decimators being coupled between a corresponding one of the frequency discriminators and the digital comparator and configured to decimate the digital outputs received from the frequency discriminators and to supply the decimated digital outputs to the digital comparator.

12. The DC-DC converter of claim 1, wherein the digitally controlled pulse width modulator is configured to have an output duty cycle controlled by a plurality of most significant bits and a plurality of least significant bits, and
wherein the digitally controlled pulse width modulator comprises:
a counter configured to supply the most significant bits; and
a delay locked loop configured to supply the least significant bits.

13. A method of operating a DC-DC converter comprising an inductor, the method comprising, during power up of the DC-DC converter:
supplying a triangular current to the inductor;
measuring a voltage waveform across the inductor;
computing an inductance of the inductor based on a magnitude of the voltage waveform;
computing a resistance of the inductor based on a slope of the voltage waveform; and
configuring a controller to apply driving waveforms to the inductor in accordance with the computed inductance and the computed resistance.

14. The method of claim 13, wherein the measuring the voltage waveform across the inductor comprises:
low-pass filtering an inductor voltage measured across the inductor;
converting the filtered inductor voltage to a first frequency signal corresponding to the inductor voltage;
converting the first frequency signal into a first digital signal corresponding to a frequency of the first frequency signal;
converting a first reference voltage to a second frequency signal corresponding to the first reference voltage;
converting the second frequency signal into a second digital signal corresponding to a frequency of the second frequency signal; and
comparing the first digital signal to the second digital signal to produce the measured voltage waveform across the inductor.

15. The method of claim 14, further comprising decimating the first digital signal and the second digital signal,
wherein the comparing the first digital signal to the second digital signal comprises comparing the decimated first digital signal and the decimated second digital signal.

16. The method of claim 14, further comprising decimating the measured voltage waveform.

17. The method of claim 13, further comprising, during operation of the DC-DC converter:
converting an output voltage of the DC-DC converter to a third frequency signal corresponding to the output voltage;
converting the third frequency signal to a third digital signal corresponding to a frequency of the third frequency signal;
converting a second reference voltage to a fourth frequency signal corresponding to the second reference voltage;
converting the fourth frequency signal into a fourth digital signal corresponding to a frequency of the fourth frequency signal; and
comparing the third digital signal to the fourth digital signal to produce a digital feedback signal.

18. The method of claim 13, further comprising, during operation of the DC-DC converter:
measuring a current sense voltage across the inductor; and
computing a load current flowing through a load coupled to an output of the DC-DC converter in accordance with the measured current sense voltage and the computed resistance.

* * * * *